US008993670B2

(12) United States Patent
Fujii et al.

(10) Patent No.: US 8,993,670 B2
(45) Date of Patent: Mar. 31, 2015

(54) GLASS-FIBER REINFORCED THERMOPLASTIC RESIN COMPOSITION AND MOLDED ARTICLE THEREOF

(75) Inventors: Osamu Fujii, Tokyo (JP); Koji Sarukawa, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 1248 days.

(21) Appl. No.: 12/162,507

(22) PCT Filed: Feb. 6, 2007

(86) PCT No.: PCT/JP2007/052001
§ 371 (c)(1),
(2), (4) Date: Oct. 1, 2008

(87) PCT Pub. No.: WO2007/097184
PCT Pub. Date: Aug. 30, 2007

(65) Prior Publication Data
US 2009/0176923 A1 Jul. 9, 2009

(30) Foreign Application Priority Data

Feb. 27, 2006 (JP) .................. 2006-049469

(51) Int. Cl.
*C08K 3/40* (2006.01)
*C08J 5/04* (2006.01)
*C08L 23/12* (2006.01)
*C08L 77/00* (2006.01)

(52) U.S. Cl.
CPC .............. *C08J 5/043* (2013.01); *C08J 2323/12* (2013.01); *C08J 2367/02* (2013.01); *C08J 2377/00* (2013.01); *C08L 23/12* (2013.01); *C08L 77/00* (2013.01)
USPC ...................................... 524/494

(58) Field of Classification Search
CPC ...... C08K 4/14; C08K 2201/004; C08K 7/02; C08K 3/40; C08L 77/06; C08L 77/00; C08L 77/02; C08J 11/06; C08J 5/043
USPC ............... 118/234; 156/181, 441; 428/298.7; 524/90, 99, 252, 423, 430, 436, 493, 524/494, 606
See application file for complete search history.

(56) References Cited

U.S. PATENT DOCUMENTS

| 2,513,188 | A | 6/1950 | Macallum |
|---|---|---|---|
| 3,257,357 | A | 6/1966 | Stamatoff |
| 3,257,358 | A | 6/1966 | Stamatoff |
| 3,274,165 | A | 9/1966 | Lenz et al. |
| 3,306,874 | A | 2/1967 | Hay |
| 3,306,875 | A | 2/1967 | Hay |
| 3,929,930 | A | 12/1975 | Izawa et al. |
| 4,011,200 | A | 3/1977 | Yonemitsu et al. |
| 4,016,145 | A | 4/1977 | Campbell |
| 4,020,437 | A | 4/1977 | Kern |
| 4,549,920 | A | 10/1985 | Cogswell et al. |
| 4,559,262 | A | 12/1985 | Cogswell et al. |
| 4,684,686 | A | 8/1987 | Hepp |
| 5,019,450 | A | 5/1991 | Cogswell et al. |
| 5,071,912 | A | 12/1991 | Furuta et al. |
| 5,342,920 | A | 8/1994 | Imai et al. |
| 5,433,419 | A | 7/1995 | Murakami |
| 5,712,330 | A | 1/1998 | Funayama et al. |
| 5,741,846 | A | 4/1998 | Lohmeijer et al. |
| 5,780,534 | A | 7/1998 | Kleiner et al. |
| 5,840,798 | A * | 11/1998 | Vollenberg et al. ........... 524/423 |
| 5,911,932 | A | 6/1999 | Dysterhouse |
| 6,042,765 | A * | 3/2000 | Sugahara et al. ............ 264/46.1 |
| 6,156,869 | A | 12/2000 | Tamura et al. |
| 6,258,453 | B1 | 7/2001 | Montsinger |
| 6,265,472 | B1 * | 7/2001 | Fujii et al. ....................... 524/88 |
| 6,291,064 | B1 | 9/2001 | Kadowaki et al. |
| 6,596,893 | B2 | 7/2003 | Nakacho et al. |
| 6,815,491 | B2 | 11/2004 | Adedeji et al. |
| 6,942,823 | B2 | 9/2005 | Terada et al. |
| 6,946,084 | B2 | 9/2005 | Nakagawa et al. |
| 2003/0050376 | A1 | 3/2003 | Oka et al. |

(Continued)

FOREIGN PATENT DOCUMENTS

BG 29437 11/1980
CA 948049 5/1974

(Continued)

OTHER PUBLICATIONS

English Language Abstract of JP 5-247341.
English Language Abstract of JP 4-77554.
English Language Abstract of JP 7-41651.
English Language Abstract of JP 10-292108.
English Language Abstract of JP2-173047.
English Language Abstract of JP 57-181852.
English Language Abstract of JP 5-162124.
English Language Abstract of JP 2005-349697.
English Language Abstract of JP 2005-298663.

(Continued)

*Primary Examiner* — Ling Choi
*Assistant Examiner* — Chun-Cheng Wang
(74) *Attorney, Agent, or Firm* — Greenblum & Bernstein, P.L.C.

(57) ABSTRACT

The present invention provides a glass fiber-reinforced thermoplastic resin composition in which a particular relationship is satisfied between the glass fiber content (W (parts by weight)) and the melt viscosity (η) of the thermoplastic resin composition at molding temperature as determined at a shear rate of 1,000 sec$^{-1}$. According to the present invention, there can be obtained a glass fiber-reinforced thermoplastic resin having increased strength and rigidity and excellent in practical characteristics such as impact resistance and antifreeze liquid resistance. In addition, molded articles obtained by injection-molding the composition are available as components having reduced anisotropies of mechanical characteristics and mold shrinkage factor.

8 Claims, No Drawings

(56) References Cited

U.S. PATENT DOCUMENTS

| | | | |
|---|---|---|---|
| 2004/0044105 A1* | 3/2004 | Webster | 524/99 |
| 2009/0105395 A1* | 4/2009 | Kamata et al. | 524/502 |

FOREIGN PATENT DOCUMENTS

| | | |
|---|---|---|
| EP | 0 333 518 A2 | 9/1989 |
| EP | 0376616 | 7/1990 |
| EP | 0 548 696 A1 | 6/1993 |
| EP | 0699708 | 3/1996 |
| EP | 0747439 | 12/1996 |
| JP | 45-3368 | 2/1970 |
| JP | 44-27671 | 11/1970 |
| JP | 46-27255 | 8/1971 |
| JP | 50-51197 | 5/1975 |
| JP | 52-12240 | 4/1977 |
| JP | 52-17880 | 5/1977 |
| JP | 57-181852 | 11/1983 |
| JP | 61-225217 | 10/1986 |
| JP | 63-152628 | 6/1988 |
| JP | 63-37694 | 7/1988 |
| JP | 2-173047 | 7/1990 |
| JP | 2-201811 | 8/1990 |
| JP | 3-73590 | 11/1991 |
| JP | 4-77554 | 3/1992 |
| JP | 5-162124 | 6/1993 |
| JP | 5-169445 | 7/1993 |
| JP | 5-222196 | 8/1993 |
| JP | 5-247341 | 9/1993 |
| JP | 6-320536 | 11/1994 |
| JP | 7-41651 | 2/1995 |
| JP | 7-228775 | 8/1995 |
| JP | 8-48869 | 2/1996 |
| JP | 8-73720 | 3/1996 |
| JP | 8-169957 | 7/1996 |
| JP | 52-3985 | 1/1997 |
| JP | 09-71708 | 3/1997 |
| JP | 9-124926 | 5/1997 |
| JP | 9-183864 | 7/1997 |
| JP | 10-292108 | 11/1998 |
| JP | 11-181429 | 7/1999 |
| JP | 2000-37723 | 2/2000 |
| JP | 2000-103847 | 4/2000 |
| JP | 2000-290385 | 10/2000 |
| JP | 2000-309060 | 11/2000 |
| JP | 2003-55549 | 2/2003 |
| JP | 2003-175512 | 6/2003 |
| JP | 2005-263828 | 9/2005 |
| JP | 2005-298663 | 10/2005 |
| JP | 2005-349697 | 12/2005 |
| WO | 94/23433 | 10/1994 |
| WO | 02/094936 | 11/2002 |

OTHER PUBLICATIONS

English Language Abstract of JP 2003-175512.
English Language Abstract of JP 5-169445.
U.S. Appl. No. 12/181,461 to Miyoshi et. al., filed Jul. 29, 2008.
English Language Abstract of JP 63-152628.
English Language Abstract of JP 7-228775.
English Language Abstract of JP 2003-55549.
English Language Abstract of JP 61-225217.
English Language Abstract of JP 5-222196.
English Language Abstract of JP 8-48869.
English Language Abstract of JP 9-124926.
English Language Abstract of JP 09-71708.
English Language Abstract of JP 9-183864.
English Language Abstract of JP 11-181429.
English Language Abstract of JP 8-73720.
English Language Abstract of JP 2000-103847.
English Language Abstract of JP 6-320536.
English Language Abstract of JP 2000-309060.
English Language Abstract of JP 2000-290385.
English Language Abstract of JP8-169957.
English Language Abstract of JP 2005-263828.
English Language Abstract of JP 2000-37723.
English Language Abstract of JP 2-201811.
Supplementary European Search Report issued with respect to patent family member European Application EP 07708101.6, dated Nov. 2, 2011.
"*Fukugou Zairiyou Nyuumon*" by David Hull et al., Translators: Hiroo Miyairi et al., published by *Baifukan* on Jan. 10, 1984 (along with a partial English language translation).
Online machine translation of JP 2003-175512 (2005).
Online machine translation of JP 06-320536 (1994).

\* cited by examiner

GLASS-FIBER REINFORCED THERMOPLASTIC RESIN COMPOSITION AND MOLDED ARTICLE THEREOF

TECHNICAL FIELD

The present invention relates to a glass fiber-containing resin composition excellent in mechanical characteristics such as falling dart impact resistance and vibration fatigue resistance and in antifreeze liquid resistance and to an injection molded article having reduced anisotropies of mechanical strength and mold shrinkage factor, the molded article being obtained by injection-molding the composition.

BACKGROUND ART

Thermoplastic resins are widely used in automobiles, machine-related materials, building materials, home equipment components, and the like, taking advantage of their excellent forming properties. Particularly, reinforced thermoplastic resin compositions in which glass fiber is blended can be substituted for metal materials because of their excellent mechanical characteristics and moldability and are useful for producing lighter components and reducing components count. In addition, long fiber-reinforced thermoplastic resin compositions described, for example, in Patent Documents 1 and 2 are known as molding materials providing moldings excellent particularly in mechanical strength because they suffer less damage of the fiber when molded.

Patent Document 1 discloses the use of a thermoplastic resin having a melt viscosity of less than 30 Pa·s as one of methods for favorably wetting continuously aligned filaments with a thermoplastic resin. Specifically, there is disclosed an example of the use of a thermoplastic resin having a relatively low melt viscosity of 3 to 30 Pa·s during processing.

In addition, Patent Document 3 discloses a glass fiber-reinforced polyamide resin composition characterized in that the composition comprises 30 to 50 parts by weight of a polyamide resin and 50 to 70 parts by weight of glass fiber and has a molten resin viscosity ranging from 40 to 150 Pa·s during molding under a shear rate of 1,000 sec$^{-1}$. A molten resin viscosity of 150 Pa·s or more during molding is described to be prone to lead to a defective appearance due to the exposure of glass fiber on the molding surface and to an unfilled thin wall part. Then, a low-viscosity polyamide resin having a molten resin viscosity of 80 Pa·s or less is described to be preferable.

However, the above conventional techniques result in insufficient attainment of impact resistance, vibration fatigue resistance, antifreeze liquid resistance and the like inherent in resin because they use thermoplastic resins having a low molecular weight or a low melt viscosity due to excessive pursuit of enhanced productivity and easier processing.

Further, Patent Documents 4 and 5 disclose a resin composition reinforced with glass fiber; however, the composition has not provided an injection molded article having excellent physical properties.

[Patent Document 1] Japanese Patent Laid-Open No. 57-181852 (Corresponding U.S. Pat. Nos. 5,019,450 and 5,213,889)
[Patent Document 2] Japanese Patent Laid-Open No. 5-162124
[Patent Document 3] Japanese Patent Laid-Open No. 4-077554
[Patent Document 4] Japanese Patent Laid-Open No. 2005-349697
[Patent Document 5] Japanese Patent Laid-Open No. 2005-298663

DISCLOSURE OF THE INVENTION

Problems to be Solved by the Invention

The present invention has as an object the provision of a resin composition excellent in impact resistance, vibration fatigue resistance, and antifreeze liquid resistance and as another object the provision of a molded article having reduced anisotropies of mechanical characteristics and mold shrinkage factor.

Means for Solving the Problems

As a result of intensive studies, the present inventors have found that a glass fiber-reinforced thermoplastic resin composition having excellent physical properties is obtained by a particular relationship being satisfied between the glass fiber content (W (parts by weight)) and the melt viscosity ($\eta$) of the resin composition at molding temperature as determined at a shear rate of 1,000 sec$^{-1}$, and that an injection molded article obtained using the resin composition has excellent physical properties, thereby accomplishing the present invention.

Thus, the present invention is as follows.
(1) A thermoplastic resin composition comprising 30 to 90 parts by weight of a thermoplastic resin and 70 to 10 parts by weight of glass fiber having a weight average glass fiber length of 1.8 mm to 30 mm, characterized in that the glass fiber content (W (parts by weight)) of the thermoplastic resin composition and the melt viscosity ($\eta$) of the thermoplastic resin composition at a molding temperature as determined at a shear rate of 1,000 sec$^{-1}$ satisfy equation 1:

$$\eta(\text{Pa·s}) \geq 2.5 \times W(\text{parts by weight}) + 25 \qquad \text{(Equation 1)}$$

(2) The thermoplastic resin composition described in item (1), characterized in that the major to minor diameter ratio of the cross-section of the glass fiber is 1 to 1.5.
(3) The thermoplastic resin composition described in item (1) or (2), characterized in that the thermoplastic resin comprises any one of a polyamide resin, polyamide 66, a semiaromatic polyamide, polybutylene terephthalate, and polypropylene.
(4) An injection molded article obtained by injection-molding a resin composition comprising glass fiber and a thermoplastic resin, characterized in that the resin composition comprises 30 to 90 parts by weight of the thermoplastic resin and 70 to 10 parts by weight of the glass fiber; the glass fiber content (W (parts by weight)) and the melt viscosity ($\eta$) of the thermoplastic resin composition at molding temperature as determined at a shear rate of 1,000 sec$^{-1}$ satisfy equation 1:

$$\eta(\text{Pa·s}) \geq 2.5 \times W(\text{parts by weight}) + 25 \qquad \text{(Equation 1); and}$$

the weight average glass fiber length in the molded article is 1.8 mm to 5.0 mm.
(5) The injection molded article described in item (4), characterized in that the major to minor diameter ratio of the cross-section of the glass fiber is 1 to 1.5.
(6) The injection molded article described in item (4) or (5), characterized in that the thermoplastic resin comprises any one of a polyamide resin, polyamide 66, a semiaromatic polyamide, polybutylene terephthalate, and polypropylene.

Advantages of the Invention

According to the present invention, there can be obtained a glass fiber-reinforced thermoplastic resin composition having increased strength and rigidity and excellent in practical characteristics such as impact resistance and antifreeze liquid resistance. In addition, molded articles obtained by injection-molding the composition have been proved to be useful as components having reduced anisotropies of mechanical characteristics and mold shrinkage factor.

BEST MODE FOR CARRYING OUT THE INVENTION

According to the present invention, the blending ratio between a thermoplastic resin and glass fiber is 70 to 10 parts by weight of the glass fiber to 30 to 90 parts by weight of the thermoplastic resin. Obtaining sufficient mechanical characteristics requires 10 parts by weight or more of the glass fiber. In addition, sufficiently impregnating glass fiber bundles with the thermoplastic resin requires 70 parts by weight or less of the glass fiber. More preferably, the glass fiber is in an amount of 65 to 25 parts by weight based on 35 to 75 parts by weight of the thermoplastic resin, and most preferably, the glass fiber is in an amount of 60 to 34 parts by weight based on 66 to 40 parts by weight of the thermoplastic resin.

According to the present invention, the type of the thermoplastic resin is not particularly limited and exemplified by polyethylene, polypropylene, polyoxymethylene homopolymer, polyoxymethylene copolymer, polyamide, thermoplastic polyesters, ABS resin, ASS resin, polyphenylene sulfide, and modified polyphenylene ethers.

A resin effectively reinforced by glass fiber is preferably used. Examples of the effectively reinforced resin include polyamide, polyethylene terephthalate, polybutylene terephthalate, polytrimethylene terephthalate, ABS resin, polyphenylene sulfide, polyphenylene ether/polystyrene blends, and polyamide/polyphenylene ether blends.

Particularly preferred examples of the thermoplastic resin include polyamide. Examples of the polyamide which can be used include a homopolymer alone, a copolymer alone, a combination of homopolymers, a combination of copolymers and a combination of a copolymer and a homopolymer, and the like, which are obtained by optionally combining polyamide-forming monomers such as ε-caprolactam, adipic acid, sebacic acid, dodecanedioic acid, isophthalic acid, terephthalic acid, hexamethylenediamine, tetramethylenediamine, 2-methylpentamethylenediamine, 2,2,4-trimethylhexamethylenediamine, 2,4,4-trimethylhexamethylenediamine, metaxylylenediamine, and bis(3-methyl-4-aminocyclohexyl)methane.

Specific examples of such polyamides include homopolymers such as polyamide 6, polyamide 610, polyamide 612, polyamide 11, polyamide 12, polyamide M6, a polyamide obtained by polymerizing hexamethylenediamine and isophthalic acid (polyamide 6I), and a polyamide obtained by polymerizing isophthalic acid and bis(3-methyl-4-aminocyclohexyl)methane (polyamide PACMI); a polyamide obtained by polymerizing adipic acid, isophthalic acid, and hexamethylenediamine (polyamide 66/6I copolymer); a polyamide obtained by polymerizing adipic acid, terephthalic acid, and hexamethylenediamine (polyamide 66/6T copolymer); a polyamide obtained by polymerizing isophthalic acid, terephthalic acid, and hexamethylenediamine (polyamide 6I/6T copolymer); a polyamide obtained by polymerizing adipic acid, isophthalic acid, terephthalic acid, and hexamethylenediamine (polyamide 66/6I/6T copolymer); a polyamide obtained by polymerizing terephthalic acid, 2,2,4-trimethylhexamethylenediamine, and 2,4,4-trimethylhexamethylenediamine (polyamide TMDT copolymer); a polyamide obtained by polymerizing terephthalic acid and nonanediamine (polyamide 9T); a copolyamide obtained by polymerizing isophthalic acid, terephthalic acid, hexamethylenediamine, and bis(3-methyl-4-aminocyclohexyl)methane; a mixture of an interpolyamide obtained by polymerizing isophthalic acid, terephthalic acid, hexamethylenediamine, and bis(3-methyl-4-aminocyclohexyl)methane with polyamide 6; and a mixture of polyamide MXD6 and polyamide 66. Among others, semiaromatic polyamides such as polyamide 66/6T copolymer and polyamide 66/6T/6I copolymer have high melting points and are suitable for components requiring higher heat resistance, for example, components in an automobile engine room.

In addition, semiaromatic polyamides such as copolyamide 66/6I and polyamide MXD6 or mixtures of these semiaromatic polyamides and other aliphatic polyamides easily provide molded articles excellent in appearance even by the blending of glass fiber because the crystallization temperatures can be controlled as appropriate by adjusting the copolymerization or mixing ratios thereof.

Further, a mixture of polyamide 610 or polyamide 612 and polyamide 66 is excellent in the balance of chemical resistance and heat resistance and suitable for components which could contact a snow-melting agent on roads among components in an automobile engine room.

A preferred thermoplastic resin other than polyamide can be exemplified by thermoplastic polyesters, particularly polyethylene terephthalate, polybutylene terephthalate, and polytrimethylene terephthalate. Among others, polybutylene terephthalate, which is excellent in moldability, is preferable. These thermoplastic polyesters are not only effectively reinforced by glass fiber but also less in the lowering of physical properties due to water absorption because of their low water absorption rate.

The glass fiber used in the present invention may be that used in conventional reinforced thermoplastic resins. The cross-sectional geometry of the glass fiber is preferably circular or elliptical. The fiber diameter is not particularly limited; for example, the diameter is typically 5 to 25 μm. To achieve sufficient mechanical strength, the major to minor diameter ratio of the cross-section of glass fiber is preferably 1 to 1.5, more preferably 1 to 1.1.

In addition, there may be used a glass fiber to which surface a coupling agent, a sizing agent, or the like is allowed, as appropriate, to adhere according to the type of the thermoplastic resin used. The coupling agent can be exemplified by amino-, epoxy-, chlorine- and cation-based silane coupling agents and aminosilane-based coupling agents. The sizing agent can be exemplified by maleic anhydride-, urethane- and acryl-based sizing agents and sizing agents containing these copolymers or a mixture thereof.

The weight average glass fiber length in the thermoplastic resin composition of the present invention is required to be in the range from 1.8 mm to 30 mm.

The weight average glass length is determined using the following equation where $L1, L2, \ldots Li$ are each the length of an individual glass fiber and $W1, W2, \ldots Wi$ are each the weight of an individual glass fiber.

$$\text{Weight average glass fiber length} = \Sigma Wi^2 / \Sigma Li$$

A weight average glass fiber length of not less than 1.8 mm exerts a reinforcing effect and particularly an excellent rigidity-improving effect at high temperature. The anisotropies of mechanical characteristics and mold shrinkage factor in the injection molded article are also reduced, which offers a major advantage in the design of components.

For the present invention, the anisotropy of mechanical characteristics refers to the numerical ratio of mechanical characteristics in the flow direction of resin during injection molding (hereinafter referred to as "flow direction") and in the transverse direction thereto (hereinafter referred to as "transverse direction"); the ratio closer to 1 is better. Likewise, the anisotropy of mold shrinkage factor refers to the numerical ratio of mold shrinkage factors in the flow and transverse directions; the ratio closer to 1 is better.

With a weight average glass fiber length of not more than 30 mm, the glass fiber-reinforced thermoplastic resin can be easily supplied to a molding machine during molding without using special equipment and the like. The range of the weight average glass fiber length is more preferably from 2 mm to 20 mm, particularly preferably from 2.5 mm to 15 mm.

To set the weight average glass fiber length in a thermoplastic resin composition to the range according to the present invention, there can be used, for example, a known pultrusion method employing glass fiber roving, or a pultrusion method as described in Japanese Patent Laid-Open No. 2003-175512.

The weight average glass fiber length in an injection molded article comprising the thermoplastic resin composition is 1.8 mm to 5 mm. Not less than 1.8 mm exerts a reinforcing effect and particularly an excellent rigidity-improving effect at high temperature. In addition, for example, the anisotropies of mechanical characteristics and mold shrinkage factor in the injection molded article are also reduced, which offers a major advantage in the design of components. A weight average glass fiber length of not more than 5 mm secures molding fluidity, facilitate molding into even a molded article having a relatively long flow length or a complex molding, and can provide a molded article excellent also in appearance. The range is more preferably from 2.5 mm to 3 mm.

A method for controlling the weight average glass fiber length in a molded article is not particularly limited, but it is important to use a composition containing glass fiber having a glass fiber length according to the intended fiber length. In addition, it is preferable to use a composition in which glass fiber is sufficiently impregnated with the resin.

An injection molding machine, injection molding conditions, and a mold design are not particularly limited. To control the glass fiber length in a molded article in the range of relatively large values as in the present invention, it is recommended to make a device, in the processes of melting the composition of the present invention in an injection molding machine and injecting the composition into a mold, so as to minimize shear stress applied to the molten composition.

For example, an injection molding machine having a relatively large screw channel depth may be used, and such a machine having a relatively wide check valve clearance may be selected. The breakage of glass fiber can be also suppressed by relatively increasing the nozzle diameter of the injection molding machine, the sprue of the mold, the runner diameter, and the gate diameter.

According to the thermoplastic resin composition of the present invention, the glass fiber content (W (parts by weight)) and the melt viscosity (η) at molding temperature as determined at a shear rate of 1,000 sec$^{-1}$ are required to satisfy equation 1.

$$\eta(\text{Pa·s}) \geq 2.5 \times W(\text{parts by weight}) + 25 \quad \text{(Equation 1)}$$

The melt viscosity of a resin composition generally increases with an increase in the glass fiber content thereof, but the lower melt viscosity is preferred to secure the fluidity thereof during molding. In the range of a high glass fiber concentration, too much lowering of the melt viscosity in pursuit of only securing the molding fluidity cannot satisfy the object of the present invention.

In other words, without the melt viscosity (η) satisfying equation 1, the resin composition cannot sufficiently exert practical characteristics such as impact resistance, vibration fatigue resistance, and antifreeze liquid resistance or reduce anisotropies of the mechanical characteristics and mold shrinkage factor of the injection molded article. Thus, use of the thermoplastic resin composition of the present invention can avoid the limitation of applications, the forced design of an excessively thick section, and the provision of a correction process for preventing deformation.

The thermoplastic resin composition of the present invention preferably has a melt viscosity (η) of 500 Pa·s or less as determined at molding temperature and a shear rate of 1,000 sec$^{-1}$. A melt viscosity of 500 Pa·s or less can secure a sufficient fluidity in the injection molded article and facilitates the forming in the mold. In the case of components for which a higher fluidity is required, the melt viscosity is preferably controlled to a lower level within the range satisfying equation 1.

Methods for controlling the melt viscosity so as to satisfy equation 1 include a method which involves properly selecting the molecular weight of the thermoplastic resin used depending on the blending amount of glass fiber. Specifically, a greater blending amount of glass fiber increases the melt viscosity of the resin composition; thus, the melt viscosity of the resin composition can be lowered using a thermoplastic resin having a low molecular weight.

The molecular weight of a thermoplastic resin, for example, polyamide resin or polyester resin, can be controlled by properly selecting the raw material moisture content and the degree of vacuum by means of a vacuum vent in the process of plasticizing a resin before impregnating glass fiber bundles, or by using an additive having a polymerization-catalyzing effect, an additive promoting hydrolysis, or the like. Similarly, the molecular weight of an olefin-based resin such as polypropylene resin can be properly controlled by adding a peroxide or the like in the plasticizing process.

Use of a thermoplastic resin having a high melt viscosity may make difficult the impregnation of glass fiber with the resin. The preferred production method can be exemplified by a method involving, in an impregnation die where a molten thermoplastic resin supplied from an extruder is to contact with glass fiber bundles, impregnation by introducing the molten thermoplastic resin and the glass fiber bundles into the impregnation die from the downstream and upstream sides, respectively or a method involving impregnation by zigzag passing glass fiber bundles through a plurality of rolls placed in an impregnation die to open the bundles. For further sufficient impregnation, a method is effective which involves cooling a strand pull out of an impregnation die and then twisting the strand using a pulling device. Even when a thermoplastic resin having a high melt viscosity is used, the twisting promotes the impregnation of the molten thermoplastic resin into glass fiber bundles near the outlet of an impregnation die. Insufficient impregnation of the resin into glass fiber is prone to produce the breakage of glass fiber when the resin composition is injection-molded, and tends to decrease the weight average glass fiber length in the injection molded article.

According to the present invention, the melt viscosity may be measured using a common melt viscometer. In measuring the melt viscosity, the thermoplastic resin composition is required to be dried to a moisture content of 0.1% or less to stabilize measurements. The melt viscosity varies depending on the measurement temperature, shear rate, capillary caliber, capillary length, and entrance angle. Particularly, the measurement results greatly vary depending on the measurement temperature and shear rate. The measurement is made at the temperature during molding.

For a condensation type crystalline resin such as polyamide and polyester, the molding temperature according to the present invention is set to a temperature 40° C. higher than the melting point peak as measured at a rate of temperature rise of 20° C./min using a differential scanning calorimeter (DSC). For a non-condensation type crystalline resin such as polypropylene, the molding temperature is set to a temperature 70° C. higher than the melting point peak as measured at a rate of temperature rise of 20° C./min using DSC. For a non-crystalline resin, the molding temperatures are set to the range of temperatures 140° C. higher than the glass transition temperature as measured at a rate of temperature rise of 20° C./min using DSC. As a shear rate is used the value of 1,000 $sec^{-1}$. Other measurement conditions will be described in Examples.

Where appropriate, the glass fiber-reinforced thermoplastic resin composition of the present invention may also contain, in such an extent that the object of the present invention is not impaired, additives used in conventional thermoplastic resins, such as an antioxidant, an ultraviolet absorber, a thermal stabilizer, a photodegradation inhibitor, a dispersant, an impact modifier, a plasticizer, a lubricant, a mold-releasing agent, a nucleating agent, a halogen flame retardant, a non-halogen (e.g., polyphosphate- or red phosphorus-based) flame retardant, a flame retardant auxiliary, a dye, and a pigment. A different thermoplastic resin may be also blended.

EXAMPLES

The present invention is specifically described below based on Examples and Comparative Examples. However, the present invention is not intended to be limited thereto in any manner.

Example 1

The thermoplastic resin used was polyamide 66 resin (Leona 1300S (trade name) manufactured by Asahi Kasei Chemicals Corporation, formic acid solution viscosity (ASTM D789): 48, moisture content: 0.08% by weight), and the glass fiber used was glass rovings each formed of a bundle of about 4,200 glass filaments having a filament diameter of 17 μm (major to minor diameter ratio: 1) (T-428 (trade name) manufactured by Nippon Electric Glass Co., Ltd.). For the purpose of preparing a composition, a twin-screw extruder (ZSK25 (trade name) manufactured by Coperion Ltd.) was used to melt polyamide 66 resin at a barrel temperature of 310° C. and a screw rotation number of 300 rpm, followed by supplying the molten resin to a crosshead equipped with a roll for resin impregnation in a production unit for long fiber-reinforced resins, manufactured by Kobe Steel, Ltd. as specifically described in Japanese Patent Laid-Open No. 2003-175512.

Two glass rovings were then introduced from a roving platform in the production unit for long fiber-reinforced resins into the crosshead filled with the molten polyamide resin. The glass rovings and polyamide resin in the crosshead were continuously drawn through a nozzle to provide one strand. The resultant strand was cool-solidified in a water-cooled bath and then pelletized into the form of cylindrical pellets having a length of about 1 cm and a diameter of about 3 mm by use of a pelletizer.

In this respect, conditions for taking off the strand were set to a drawing nozzle diameter of 2.8 mm, a take-off speed of 60 m/min, and a discharge rate of the resin composition of 8.7 kg/hr, and the glass fiber content in the resin composition was controlled into about 50 parts by weight. In the taking-off, the strand was twisted by turning round on its axis in the direction of taking-off the strand.

The resultant pellets were evaluated by the following methods.

(1) Glass Fiber Content

The glass fiber content of the resultant pellet was determined by a combustion method according to ISO 3451-4.

(2) Weight Average Glass Fiber Length

The resultant pellet was burned at 800° C. in an electric furnace until no resin component is present. Using polyethylene glycol, the resultant glass fiber was spread on a slide glass so gently as not to damage the fiber. The fiber was observed under a light microscope, and the length of about 50 glass fibers randomly selected was measured using an image analyzer (IP-1000 (trade name) manufactured by Asahi Kasei Corporation), followed by determining the weight average glass fiber length in the composition according to the following equation.

Weight average glass fiber length=$\Sigma Wi^2/\Sigma Li$ (Li: the length of a glass fiber, Wi: the weight of a glass fiber, and i: 1 to 50)

Using an injection molding machine (IS80EPN (trade name) manufactured by Toshiba Machine Co., Ltd.), the resultant pellet was also injection-molded by properly adjusting the injection pressure and speed so as to provide a cylinder temperature of the melting point+25° C. and a fill time of about 1 second to give an ASTM No. 1 dumbbell specimen. In this respect, the mold temperature was properly set in the range of from 80 to 120° C. depending on the glass transition temperature of the composition.

Using the resultant specimen, the length of about 500 glass fibers randomly selected was measured in the same way using an image analyzer (IP-1000 (trade name) manufactured by Asahi Kasei Corporation), followed by determining the weight average glass fiber length in the molded article.

(3) Melt Viscosity at Molding Temperature

A specimen obtained as described in (2) above was ground to a size of 4 mm square or less and dried to a moisture content of 0.1 wt % or less (0.01 wt % or less for a thermoplastic polyester resin). The melt viscosity of the resultant ground product was measured using a melt viscometer (Twin Capillary Rheometer (trade name) Model RH7-2 manufactured by Rosand).

Polyamide and polyester were each allowed to reside for 3 minutes at a temperature 40° C. higher than the melting point thereof as measured using DSC (rate of temperature rise: 20° C./min), and polypropylene, for 3 minutes at a temperature 70° C. higher than the melting point thereof as measured using DSC (rate of temperature rise: 20° C./min); the melt viscosity was then measured at a shear rate ranging from 100 to 5,000 $sec^{-1}$. The melt viscosity at a shear rate of 1,000 $sec^{-1}$ was determined and used as the melt viscosity during molding. Here, the measurement was carried out at a capillary caliber and length of 1 mm and 16 mm, respectively, and an entrance angle of 180°.

(4) Charpy Impact Strength

The pellet was injection-molded as described in (2) above to provide a flat plate of 150×150×4 mm. In this respect, the gate have a size of 6×4 mm and is located at the middle of one side of the square-form plate. Two specimens of 80×10×4 mm were cut out of the resultant flat plate. In this regard, one specimen was cut out so that the long side was in the flow direction; another, so that the long side was in the transverse direction. The Charpy impact strength of the resultant specimens was measured according to ISO 180. It is preferable that both of the specimens cut out in the flow and transverse directions have higher values of the Charpy impact strength and the ratio thereof is closer to 1.

(5) Flexural Properties

Two specimens cut out in the flow and transverse directions were obtained as described in (4) above, and the flexural properties thereof were measured according to ISO 178. It is preferable that both of the specimens cut out in the flow and transverse directions have higher values of each of the flexural strength and flexural modulus and the ratio of values of each property in the flow and transverse directions is closer to 1.

(6) Vibration Fatigue Resistance

An ASTM No. 1 specimen was obtained as described in (2) above, and a tensile load was applied thereto using a sine wave having a frequency of 20 Hz under an atmosphere of 120° C. employing a hydraulic servo fatigue testing machine (EHF-50-10-3 (trade name) manufactured by Saginomiya Seisakusho, Inc.) to determine stress causing breakage after $10^6$ cycles according to JIS K7118. The higher the breaking stress is, the more excellent in vibration fatigue resistance.

(7) Evaluation of Antifreeze Liquid Resistance

A flat plate was obtained as described in (4) above and cut out in the transverse direction to the flow direction of the resin during injection molding to provide a specimen according to ISO 527. The resultant specimen was immersed in a 50:50 (weight ratio) mixture of water and an antifreeze liquid (Castle Long Life Coolant Red V9230-0104 (trade name) manufactured by TACTI Corporation) for 240 hours in an autoclave whose temperature was raised to 130° C., and then measured for tensile strength according to ISO 527.

(8) Mold Shrinkage Factor

An ASTM No. 1 specimen was obtained as described in (2) above, allowed to stand at a temperature of 23° C. and a relative humidity of 50% for 24 hours, and then measured for the dimensions thereof in the flow and transverse directions with an accuracy of 0.1 mm using a slide caliper. These measurements were compared with basic mold dimensions measured in advance at the mold temperature during molding by a similar method; the value obtained by expressing, as a percentage, the difference between the specimen and basic mold dimensions divided by the mold reference dimension was defined as a mold shrinkage factor. It is preferable that the mold shrinkage factors in the flow and transverse directions are both lower and the numerical ratio between the mold shrinkage factors in the flow and transverse directions is closer to 1.

(9) Surface Glossiness

A flat plate of 150×150×4 mm was obtained as described in (4) above, and the central part of the plate was measured for 60 degree gloss according to JIS-K7150 using a glossmeter (IG320 (trade name) manufactured by Horiba, Ltd.).

A higher gloss value indicates reduced exposure of glass fiber on the surface and more excellent appearance.

Example 2

Pellets were obtained by the same method as in Example 1 except for adjusting the glass fiber content to about 30 parts by weight.

Example 3

Pellets were obtained by the same method as in Example 1 except for adjusting the glass fiber content to about 65 parts by weight.

Example 4

Pellets were obtained by the same method as in Example 1 except for using, as a thermoplastic resin, polyamide 66/6I (82/18 wt %) copolymer (formic acid solution viscosity (ASTM D789): 43, moisture content: 0.08 wt %) and setting the extruder barrel temperature during composition preparation to 290° C.

Example 5

Pellets were obtained by the same method as in Example 4 except for using, as a thermoplastic resin, polyamide 66/6I (82/18 wt %) copolymer (formic acid solution viscosity (ASTM D789): 43, moisture content: 0.08 wt %) and setting the glass fiber content to about 30 parts by weight.

Example 6

Pellets were obtained by the same method as in Example 1 except for using, as a thermoplastic resin, polybutylene terephthalate resin (Torecon 1401×04 (trade name) manufactured by Toray Industries, Inc., moisture content: 0.01 wt %) and setting the extruder barrel temperature during composition preparation to 280° C. and the glass fiber content to about 30 parts by weight.

Example 7

Pellets were obtained by the same method as in Example 5 except for using, as a thermoplastic resin, polybutylene terephthalate resin (Torecon 1401X04 (trade name) manufactured by Toray Industries, Inc., moisture content: 0.01 wt %) and setting the glass fiber content to about 40 parts by weight.

Example 8

Pellets were obtained by the same method as in Example 1 except for using, as a thermoplastic resin, polypropylene (H03W-01 (trade name) manufactured by INEOS, MFR: 4.0 at a temperature of 230° C. and a load of 2,160 g, moisture content: 0.02 wt %) and setting the extruder barrel temperature during composition preparation to 280° C. and the glass fiber content to about 30 parts by weight.

Comparative Example 1

Pellets were obtained by the same method as in Example 1 except for using, as a thermoplastic resin, polyamide 66 (Leona 1200 (trade name) manufactured by Asahi Kasei Chemicals Corporation, formic acid solution viscosity (ASTM D789): 36, moisture content: 0.03 wt %).

Comparative Example 2

Pellets were prepared by the same method as in Comparative Example 1 except for adjusting the glass fiber content to about 30 parts by weight.

Comparative Example 3

Pellets were prepared by the same method as in Comparative Example 1 except for adjusting the glass fiber content to about 65 parts by weight.

Comparative Example 4

The thermoplastic resin used here was polyamide 66 resin (Leona 1300S (trade name) manufactured by Asahi Kasei Chemicals Corporation, formic acid solution viscosity (ASTM D789): 48, moisture content: 0.04% by weight), and the glass fiber used was glass rovings each formed of a bundle of about 4,200 glass filaments having a filament diameter of 17 μm (T-428 (trade name) manufactured by Nippon Electric Glass Co., Ltd.). For the purpose of preparing a composition, a twin-screw extruder (ZSK40MC (trade name) manufactured by Coperion Ltd.) was used. Here, a screw rotation number of 480 rpm, a discharge rate of 90 kg/hr, a barrel preset temperature of 295° C., and a polyamide resin input rate of 45 kg/hr were set, and the glass fiber content was adjusted to about 50 parts by weight. The glass fiber was directly introduced downstream of the melting position of the resin in an extruder barrel to continuously provide a glass fiber-reinforced polyamide resin strand extruded through a dice outlet having a diameter of 5 mm. The resultant strand was water-cooled and solidified, and pellets having a length of about 10 mm and a diameter of about 3 mm were then obtained using a pelletizer.

Comparative Example 5

Pellets were obtained by the same method as in Example 4 except for using, as a thermoplastic resin, polyamide 66/6I (82/18 wt %) copolymer (formic acid solution viscosity (ASTM D789): 25, moisture content: 0.03 wt %) and setting the extruder barrel temperature during composition preparation to 290° C.

Comparative Example 6

Pellets were obtained by the same method as in Comparative Example 5 except for setting the glass fiber content to about 65 parts by weight.

Comparative Example 7

Pellets were obtained by the same method as in Example 6 except for using, as a thermoplastic resin, polybutylene terephthalate resin (Torecon 1401X31 (trade name) manufactured by Toray Industries, Inc., moisture content: 0.01 wt %).

Comparative Example 8

Pellets were obtained by the same method as in Comparative Example 7 except for setting the glass fiber content to about 40 parts by weight.

Comparative Example 9

Pellets were obtained by the same method as in Example 1 except for setting the cut length of the pellet to about 40 mm.

Comparative Example 10

Pellets were obtained by the same method as in Example 8 except for using, as a thermoplastic resin, polypropylene (H35G-00 (trade name) manufactured by INEOS, MFR: 40 at a temperature of 230° C. and a load of 2,160 g, moisture content: 0.02 wt %).

Example 9

Pellets were obtained by the same method as in Example 1 except for taking off the strand without the twisting thereof in preparing a glass fiber-reinforced thermoplastic resin.
The resin was a little less impregnated into the glass fibers in the pellet than that in Example 1, and a portion of the glass fiber bundles was exposed on the surface of the pellet.

Comparative Example 11

Pellets were obtained by the same method as in Example 1 except for using, as glass fiber, that having a major to minor diameter ratio of 1.8.
The evaluation results of Examples 1 to 9 and Comparative Examples 1 to 11 are shown in Table 1 and Table 2, respectively.

TABLE 1

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Type of thermoplastic resin | Polyamide 66 | Polyamide 66 | Polyamide 66 | Polyamide 66/6I | Polyamide 66/6I | PBT | PBT | PP | Polyamide 66 |
| Glass fiber content (parts by weight) | 50.2 | 30.1 | 64.9 | 50.2 | 30.5 | 29.8 | 40.1 | 30.2 | 50.1 |
| Weight average glass fiber length in a pellet (mm) | 12.5 | 12.8 | 12.3 | 12.6 | 12.8 | 12.3 | 12.3 | 12.1 | 12.5 |
| Weight average glass fiber length in a specimen (mm) | 2.5 | 2.8 | 2.3 | 2.8 | 3.2 | 2.8 | 2.6 | 3.1 | 1.2 |
| Melt viscosity @1000 sec − 1 (Pa · s) | 175 | 148 | 200 | 160 | 115 | 110 | 142 | 143 | 152 |
| Equation 1 | | | | | | | | | |
| S: Satisfactory N: Not satisfactory | S | S | S | S | S | S | S | S | S |
| Charpy impact strength | | | | | | | | | |
| Flow direction (kJ/m$^2$) | 35 | 25 | 42 | 30 | 22 | 20 | 28 | 28 | 20 |
| Transverse direction (kJ/m$^2$) | 22 | 16 | 27 | 19 | 12 | 13 | 18 | 18 | 9 |
| Flexural strength | | | | | | | | | |
| Flow direction (MPa) | 403 | 327 | 404 | 405 | 331 | 225 | 230 | 201 | 382 |
| Transverse direction (MPa) | 216 | 165 | 218 | 220 | 169 | 115 | 116 | 102 | 178 |
| Flexural modulus | | | | | | | | | |
| Flow direction (GPa) | 14.3 | 9.9 | 17.5 | 14.5 | 10.2 | 11.0 | 15.0 | 6.9 | 14.1 |
| Transverse direction (GPa) | 6.7 | 5.1 | 8.0 | 6.9 | 5.4 | 4.9 | 6.9 | 3.8 | 5.2 |

TABLE 1-continued

|  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Vibration fatigue resistance | | | | | | | | | |
| Breaking stress after $10^6$ cycles (MPa) | 65 | 59 | 68 | 59 | 52 | 44 | 52 | 33 | 58 |
| Antifreeze liquid resistance | | | | | | | | | |
| 240-Hour tensile strength (MPa) | 78 | 65 | 80 | 75 | 62 | — | — | — | 55 |
| Mold shrinkage factor | | | | | | | | | |
| FD: Flow direction (%) | 0.23 | 0.29 | 0.22 | 0.20 | 0.27 | 0.29 | 0.26 | 0.22 | 0.24 |
| TD: Transverse direction (%) | 0.33 | 0.45 | 0.32 | 0.30 | 0.42 | 0.45 | 0.42 | 0.32 | 0.52 |
| FD/TD ratio | 0.70 | 0.64 | 0.69 | 0.73 | 0.63 | 0.64 | 0.62 | 0.69 | 0.46 |
| 60° Gloss | 75 | 80 | 70 | 80 | 85 | 85 | 85 | 70 | 75 |

TABLE 2

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 |
|---|---|---|---|---|---|---|---|---|---|---|---|
| Type of thermoplastic resin | Polyamide 66 | Polyamide 66 | Polyamide 66 | Polyamide 66 | Polyamide 66/6I | Polyamide 66/6I | PBT | PBT | Polyamide 66 | PP | Polyamide 66 |
| Glass fiber content (parts by weight) | 49.8 | 30.1 | 65.2 | 50.2 | 50.2 | 30.1 | 29.9 | 40.0 | 50.0 | 30.3 | 50.3 |
| Weight average glass fiber length in a pellet (mm) | 12.5 | 12.8 | 12.3 | 1.3 | 12.6 | 12.5 | 12.3 | 12.5 | 43.5 | 12.2 | 12.1 |
| Weight average glass fiber length in a specimen (mm) | 2.8 | 3.2 | 2.4 | 0.6 | 2.9 | 3.3 | 2.9 | 2.8 | Unmoldable due to the bridging of pellets in the machine | 3.4 | 1.8 |
| Melt viscosity@1000 sec − 1 (Pa·s) | 138 | 94 | 180 | 151 | 131 | 66 | 72 | 115 | | 98 | 145 |
| Equation 1 | | | | | | | | | | | |
| S: Satisfactory N: Not satisfactory | N | N | N | S | N | N | N | N | hopper | N | N |
| Charpy impact strength | | | | | | | | | | | |
| Flow direction (kJ/m$^2$) | 30 | 18 | 37 | 30 | 28 | 16 | 18 | 23 | | 25 | 37 |
| Transverse direction (kJ/m$^2$) | 12 | 8 | 16 | 12 | 11 | 7 | 8 | 11 | | 13 | 23 |
| Flexural strength | | | | | | | | | | | |
| Flow direction (MPa) | 403 | 312 | 405 | 354 | 405 | 322 | 225 | 232 | | 200 | 350 |
| Transverse direction (MPa) | 176 | 148 | 176 | 123 | 192 | 148 | 98 | 101 | | 98 | 183 |
| Flexural modulus | | | | | | | | | | | |
| Flow direction (GPa) | 14.2 | 9.8 | 16.9 | 14.3 | 14.6 | 9.9 | 10.1 | 14.3 | | 6.9 | 13.9 |
| Transverse direction (GPa) | 5.3 | 4.1 | 6.3 | 4.9 | 5.5 | 4.2 | 4.1 | 5.5 | | 3.3 | 6.2 |
| Vibration fatigue resistance | | | | | | | | | | | |
| Breaking stress after $10^6$ cycles (MPa) | 62 | 56 | 65 | 60 | 56 | 49 | 40 | 46 | | 25 | 50 |
| Antifreeze liquid resistance | | | | | | | | | | | |
| 240-Hour tensile strength (MPa) | 68 | 55 | 70 | 50 | 44 | 38 | — | — | | — | 69 |
| Mold shrinkage factor | | | | | | | | | | | |
| FD: Flow direction (%) | 0.23 | 0.28 | 0.20 | 0.21 | 0.20 | 0.27 | 0.28 | 0.26 | | 0.21 | 1.23 |
| TD: Transverse direction (%) | 0.39 | 0.49 | 0.38 | 0.35 | 0.35 | 0.47 | 0.48 | 0.46 | | 0.35 | 1.33 |
| FD/TD ratio | 0.59 | 0.57 | 0.58 | 0.60 | 0.57 | 0.57 | 0.58 | 0.57 | | 0.60 | 0.70 |
| 60° Gloss | 75 | 80 | 75 | 76 | 82 | 86 | 85 | 85 | | 68 | 78 |

When compared with Comparative Examples 1 to 3 in the same glass fiber content, Examples 1 to 3 are excellent in the Charpy impact strength, vibration fatigue resistance and antifreeze liquid resistance, and superior because of reduced anisotropies of the flexural strength, flexural modulus and mold shrinkage factor. Similarly, when compared with Comparative Examples 5 and 6, Examples 4 and 5 are excellent in the Charpy impact strength, vibration fatigue resistance and antifreeze liquid resistance. Also in the comparison of Examples 6 and 7 with Comparative Examples 7 and 8, the above similar effects are noted in the Charpy impact strength, vibration fatigue resistance, flexural strength, flexural modulus and mold shrinkage factor.

In addition, comparison between Example 1 and Comparative Example 4 shows that even with the melt viscosity satisfying equation 1, the performance is not sufficiently exerted when the weight average fiber length is not in the range according to the present invention. The values of 60° gross in Examples 4, 5, 6, and 7 show that polyamide 66/6I copolymer or polybutylene terephthalate is suitable as a thermoplastic resin for appearance-oriented components. Comparison between Example 8 and Comparative Example 10 shows that Example 8 in which the melt viscosity of the thermoplastic resin satisfies the range according to the present invention is excellent in the impact strength, flexural strength, flexural modulus in the transverse direction, and vibration fatigue resistance and superior because of the reduced anisotropy of the mold shrinkage factor.

Also, comparison between Examples 1 and 9 shows that even with the melt viscosity range satisfying the range according to the present invention, the impact strength, flexural strength, and vibration fatigue resistance are reduced to some extent when the weight average glass fiber length in the molded article is not in the range according to the present invention. Further, the results of Comparative Example 11 show that the high major to minor diameter ratio of glass fiber makes the glass fiber easy to break, allows the melt viscosity to depart from the range according to the present invention, and reduces the impact strength, flexural strength, and vibration fatigue resistance even when the pellets are prepared as described in Example 1.

INDUSTRIAL APPLICABILITY

The resin composition of the present invention can be used to replace metal materials in the fields of automobiles, machine-related materials, building materials, home equipment components, and the like, which enables the production of lighter components and the reduction of components count.

The invention claimed is:

1. A thermoplastic resin composition comprising 30 to 90 parts by weight of a thermoplastic resin and 70 to 10 parts by weight of glass fibers having a weight average glass fibers length of 1.8 mm to 30 mm, wherein the glass fiber content (W) of the thermoplastic resin composition and the melt viscosity ($\eta$) of the thermoplastic resin composition at a molding temperature, as determined at a shear rate of 1,000 sec$^{-1}$, satisfy equation 1:

$$\eta(Pa \cdot s) \geq 2.5 \times W(\text{parts by weight}) + 25 \qquad \text{(Equation 1);}$$

the glass fibers are incorporated into the thermoplastic resin composition by a pultrusion method; and the thermoplastic resin has a melt viscosity ($\eta$) of 110 to 500 Pa·s as determined at molding temperature and a shear rate of 1,000 sec$^{-1}$.

2. The thermoplastic resin composition according to claim 1, wherein the major to minor diameter ratio of the cross-section of the glass fiber is 1 to 1.5.

3. The thermoplastic resin composition according to claim 1, wherein the thermoplastic resin comprises any one of a polyamide resin, polyamide 66, a semiaromatic polyamide, polybutylene terephthalate, and polypropylene.

4. An injection molded article obtained by injection-molding a resin composition comprising glass fibers and a thermoplastic resin, wherein the resin composition comprises 30 to 90 parts by weight of the thermoplastic resin and 70 to 10 parts by weight of the glass fibers; the glass fiber content (W) and the melt viscosity ($\eta$) of the thermoplastic resin composition at a molding temperature, as determined at a shear rate of 1,000 sec$^{-1}$, satisfy equation 1:

$$\eta(Pa \cdot s) \geq 2.5 \times W(\text{parts by weight}) + 25 \qquad \text{(Equation 1);}$$

wherein the weight average glass fiber length in the molded article is 1.8 mm to 5.0 mm;

the glass fibers are incorporated into the thermoplastic resin composition by a pultrusion method; and the thermoplastic resin has a melt viscosity ($\eta$) of 110 to 500 Pa·s as determined at molding temperature and a shear rate of 1,000 sec$^{-1}$.

5. The injection molded article according to claim 4, wherein the major to minor diameter ratio of the cross-section of the glass fiber is 1 to 1.5.

6. The injection molded article according to claim 4, wherein the thermoplastic resin comprises any one of a polyamide resin, polyamide 66, a semiaromatic polyamide, polybutylene terephthalate, and polypropylene.

7. The thermoplastic resin composition according to claim 2, wherein the thermoplastic resin comprises any one of a polyamide resin, polyamide 66, a semiaromatic polyamide, polybutylene terephthalate, and polypropylene.

8. The injection molded article according to claim 5, wherein the thermoplastic resin comprises any one of a polyamide resin, polyamide 66, a semiaromatic polyamide, polybutylene terephthalate, and polypropylene.

* * * * *